UNITED STATES PATENT OFFICE.

WASHINGTON MANN, OF FRESNO CITY, CALIFORNIA.

INSECTICIDE.

SPECIFICATION forming part of Letters Patent No. 435,509, dated September 2, 1890.

Application filed April 21, 1890. Serial No. 348,902. (No specimens.)

*To all whom it may concern:*

Be it known that I, WASHINGTON MANN, a citizen of the United States, residing at Fresno City, county of Fresno, State of California, have discovered a new and useful composition of matter to be used in the extermination and destruction of insect pests of all kinds which live or feed upon trees of all kinds, vines, shrubs, plants, &c., of which the following is a specification.

My composition consists of the following ingredients combined in the following proportions, to-wit: One part flowers of smart-weed, one part of lime, two parts of sulphur. These three ingredients to be well mixed together and applied as follows: Bore a hole in the trunk of the tree, vine, shrub, or plant affected a little above the ground, to the center, the size of the hole to vary according to the size of the tree, vine, shrub, or plant treated. Fill the hole with the above composition and tamp it in solidly and plug the hole up tight with beeswax. It is better to apply this composition in the spring of the year to get the best results, as the sap is then coming from the roots and will take up and carry this composition to all parts of the tree, vine, shrub, or plant so treated and so permeate the tree that insects feeding thereon will die or leave the plant.

What I claim, and desire to secure by Letters Patent of the United States, is—

The herein-described composition of matter to be used for the extermination and destruction of insect pests of all kinds which live or feed upon trees of all kinds, vines, shrubs, plants, &c., consisting of one part flowers of smart-weed, one part lime, and two parts sulphur.

WASHINGTON MANN.

Witnesses:
EDGAR S. VAN METER.
GEO. L. WARLOW.